No. 782,643. PATENTED FEB. 14, 1905.
A. CASTELIN.
ANCHORING DEVICE FOR TRACTORS.
APPLICATION FILED JULY 16, 1904.

2 SHEETS—SHEET 1.

Witnesses:

Inventor
André Castelin

No. 782,643. PATENTED FEB. 14, 1905.
A. CASTELIN.
ANCHORING DEVICE FOR TRACTORS.
APPLICATION FILED JULY 16, 1904.

2 SHEETS—SHEET 2.

Witnesses:

Inventor
Andre Castelin

No. 782,643.

Patented February 14, 1905.

UNITED STATES PATENT OFFICE.

ANDRÉ CASTELIN, OF PARIS, FRANCE, ASSIGNOR TO LA SOCIÉTÉ ANONYME D'ETUDES ET D'EXPLOITATION DES BREVETS A. CASTELIN POUR MACHINES AGRICOLES AUTOMOBILES, OF PUTEAUX, FRANCE.

ANCHORING DEVICE FOR TRACTORS.

SPECIFICATION forming part of Letters Patent No. 782,643, dated February 14, 1905.

Application filed July 16, 1904. Serial No. 216,885.

*To all whom it may concern:*

Be it known that I, ANDRÉ CASTELIN, engineer, a citizen of the French Republic, residing at Paris, France, have invented certain new and useful Improvements in Anchoring Devices for Tractors Used in Operating Agricultural Implements, of which the following is a specification.

This invention relates to new and useful improvements in anchoring devices for tractors used in operating agricultural implements, and has for its object the construction of an anchoring device adapted to be secured to a tractor used for operating agricultural implements—such as plows, mowers, reapers, and the like—which device will effectually prevent movement or overturning of the tractor when operating such implement.

In anchoring devices as heretofore constructed it has been found that when the tractor is set in operation to draw a plow across a field, for example, the horizontal pull upon the cable attached to the plow and the weight of the tractor have a tendency to lift or turn the tractor on the fulcrum formed by the bearing of the anchor on the ground, and thus frustrate the very object of the device. My invention overcomes this difficulty and provides a means which will not only prevent the tractor from turning on the free end of the anchoring device as a fulcrum, but also serves to lift the anchoring device from operative relation and secure it in such position while the tractor is being moved from place to place.

Other objects of my invention will hereinafter appear.

In describing my invention in detail reference is had to the accompanying drawings, in which I have set forth the preferred embodiment of the invention; but it is to be understood that I do not limit myself to the details of construction therein set forth, but changes, variations, and modifications may be made therein as come within the scope of the protection prayed.

Figure 1:
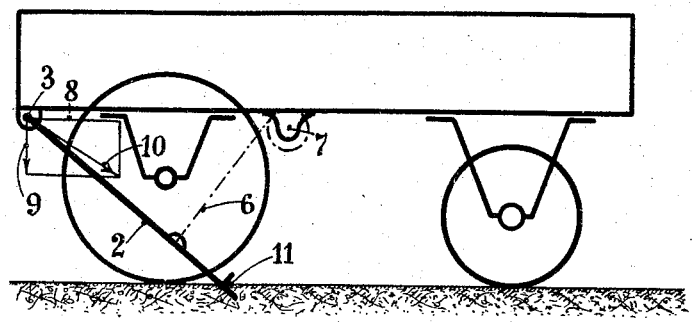
Figure 2:
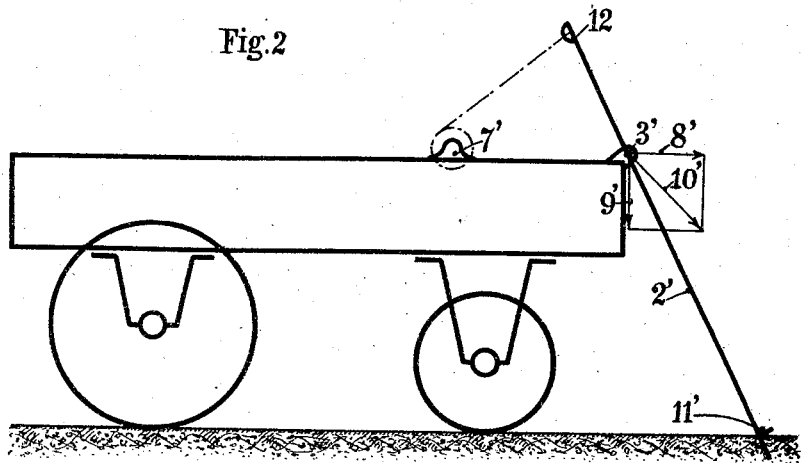
Figure 3:
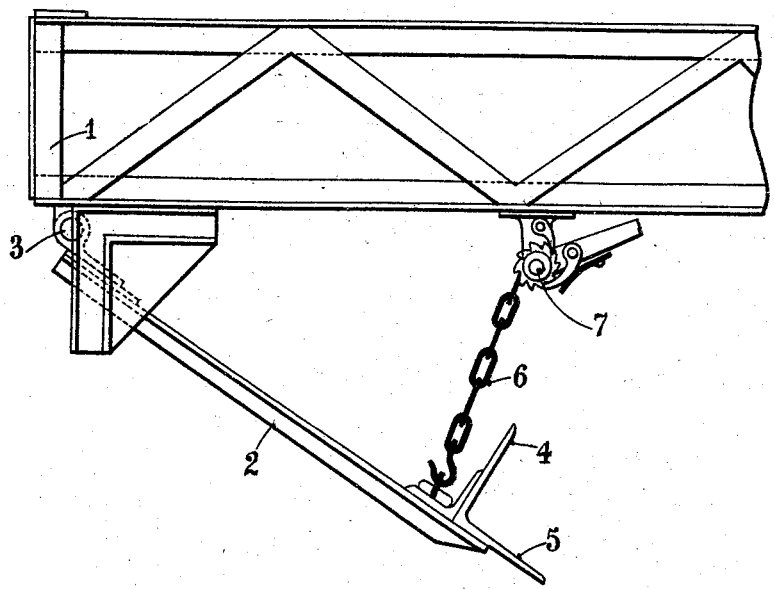
Figure 4:
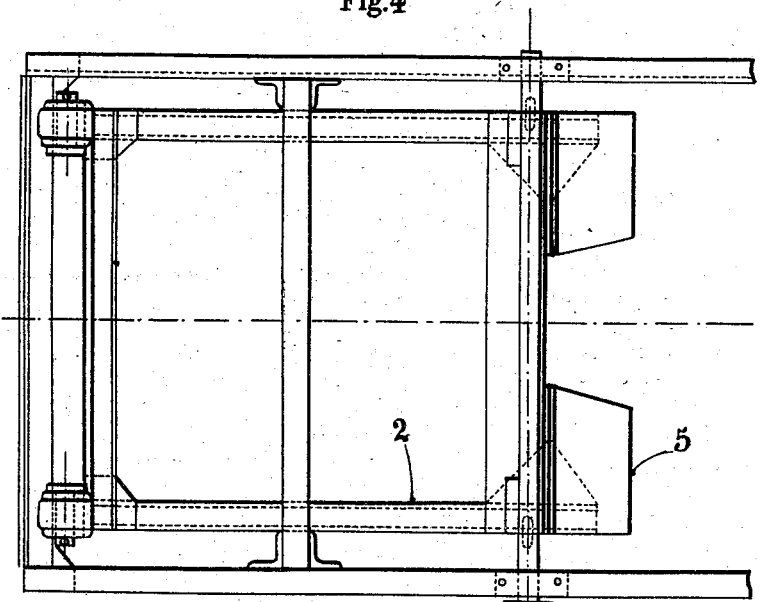

Referring to the drawings, Figure 1 is a diagrammatic view of a tractor adapted to operate an agricultural implement from its rear end and having my improved anchoring device attached to its forward end. Fig. 2 is a diagrammatic view of the same tractor having my improved anchoring device secured to its rear end. Figs. 3 and 4 are a side elevation and plan view, respectively, showing a portion of a tractor equipped with my improved anchoring device at its forward end, the former showing the anchoring device in operative relation and the latter showing the anchoring device when raised out of operative relation.

Referring to Figs. 1, 3, and 4, the reference character 1 denotes the tractor used for operating an agricultural implement from its rear end. This tractor may be of any known construction, such as the well-known traction-engine, and therefore will not be illustrated or described in detail. 2 denotes a frame formed of side and end members and provided at one end with anchors or spades adapted to enter the ground. Each of these anchors consists of an angle-iron suitably secured by bolts or rivets to the lower end member of the frame and so arranged that one member, 5, forms a spade to penetrate the ground, and the other member, 4, extending at an angle thereto, will bear upon the ground and limit the penetration of said member 5. One or more of these anchors may be employed, according to the width of the frame 2. The frame 2 is arranged for connection with one end or other suitable part of a tractor and is adapted to extend at an angle thereto in the same direction as the cable connected to the implement to be operated.

In Figs. 3 and 4 of the drawings I have shown the frame 2 as provided at its upper end with eyes through which extend lugs or pins depending from the lower surface of the tractor-bed and extending transversely thereof. To each end of that end member of the frame 2 which carries the anchors or spades is secured an eye or other suitable device, to which is attached one end of a chain, rope, or other suitable device which has its other end suitably secured to the tractor at some distance from the point of attachment of the frame 2 to the tractor. I have shown in Fig. 3 of the drawings a chain 6, having one end provided with a hook adapted to engage the eye on the frame 2 and having its other end secured to and adapted to be wound upon a drum or shaft 7, mounted upon the tractor. A ratchet-and-pawl mechanism serves to rotate the drum or shaft 7 and wind the chain 6 thereupon. Instead of the chain 6 a rope, cable, or other flexible device may be used.

In Fig. 2 I have shown a diagrammatic view of a tractor having my anchoring device attached to the rear end thereof. When so used, the anchoring-frame 2' is hingedly connected to the rear end of the upper surface of the tractor-bed, as at 3', and is provided with an upward extension 12. The chain or other device is connected to the free end of said extension and has its other end connected to and adapted to be wound upon a shaft or drum 7', which is preferably mounted on the upper surface of the tractor-bed.

It will be evident that in the absence of the chain or other device 6 when the tractor is set in operation and the anchors 2 have penetrated the ground the pull exerted by the resultant force 10 of the horizontal component 8 (due to the tractive force on the cable drawing the implement toward the tractor) and the vertical component 9, (due to the weight of the tractor,) Fig. 1, being exerted within the angle formed by the lower surface of the bed of the tractor and the anchor-frame 2 would have a tendency to lift or turn the tractor upon the fulcrum 11, formed by the lower end of said frame. This is effectually prevented by the chain or other device 6, which in combination with the bed of the tractor and the frame 2 forms a triangle the angles of which cannot be changed or distorted after once being set. Similarly when the anchoring-frame 2' is attached to the rear end of the tractor-bed, as shown in Fig. 2, the resultant force of the horizontal and vertical components 8' and 9', acting at the point 3', (the point of connection of the anchor-frame with the tractor-bed,) being exerted outside the angle formed by the anchor-frame 2' and the rear end of the tractor has a tendency to lift or turn the tractor on the fulcrum 11', formed by the lower end of the anchor-frame, and thereby move or overturn the tractor. Here the chain or other device connected at one end to the free end of the extension 12 of the anchor-frame 2' and at its other end to the upper surface of the tractor-bed prevents such movement or overturning. It will therefore be perceived that the chain or other device serves both to prevent the lifting or turning of the tractor upon the fulcrum formed by the anchoring-frame and also as a means for lifting said anchoring-frame from the ground when not in use or when it is desired to move the tractor from place to place.

Having now described my invention, what I claim, and desire to secure by Letters Patent, is—

1. An anchoring device for a tractor, comprising a frame adapted to be secured to a tractor and to extend at an angle thereto, said frame provided with means adapted to penetrate the ground, and means connected at one end with the frame and having its other end adapted to be connected to the tractor to prevent the tractor from turning on the free end of said frame as a fulcrum.

2. An anchoring device for a tractor, comprising a frame adapted to be secured to a tractor and to extend at an angle thereto, a spade carried by one end of the frame and adapted to penetrate the ground to prevent movement and overturning of the tractor, said spade provided with means to limit the penetration thereof, and means connected at one end with the frame and having its other end adapted to be connected to the tractor to prevent the tractor from turning on the free end of said frame as a fulcrum.

3. An anchoring device for a tractor, comprising a frame adapted to be secured to a tractor and to extend at an angle thereto, means carried by one end of said frame adapted to penetrate the ground to prevent movement and overturning of the tractor during the operation thereof, and means extending at an angle to said last-mentioned means adapted to limit the penetration thereof, and means adapted to be secured to said frame and to the tractor to prevent the tractor from turning on said penetrating means as a fulcrum during the operation of the tractor.

4. An anchoring device for a tractor, comprising a frame adapted to be secured to a tractor and to extend at an angle thereto, said frame provided with means adapted to penetrate the ground, and means adapted to be connected to said penetrating means and to the tractor to prevent the latter from turning on said penetrating means as a fulcrum during the operation of the tractor.

5. An anchoring device for a tractor, comprising a frame adapted to be hingedly connected with a tractor and to extend at an angle thereto, said frame provided with means adapted to penetrate the ground, and means connecting the frame with the tractor to prevent the tractor from turning on said penetrating means as a fulcrum.

6. An anchoring device for a tractor, comprising a frame adapted to be secured to a tractor and to extend at an angle thereto, said frame provided with means adapted to penetrate the ground to prevent movement and overturning of the tractor and an adjustable connection between the frame and the tractor adapted to prevent the tractor from turning on the free end of said frame as a fulcrum.

7. An anchoring device for a tractor, comprising a frame adapted to be secured to a tractor and to extend at an angle thereto, said frame provided with means adapted to penetrate the ground, an adjustable connection between the frame and the tractor, and means for setting said connection in its adjusted position.

In testimony whereof I have hereunto set my hand in presence of two subscribing witnesses.

ANDRÉ CASTELIN.

Witnesses:
HANSON C. COXE,
PAUL BLUM.